United States Patent

[11] 3,597,854

| [72] | Inventor | Edwina P. Trimmer |
| | | P.O. Box 922, Santa Ana, Calif. 92702 |
| [21] | Appl. No. | 886,949 |
| [22] | Filed | Dec. 22, 1969 |
| [45] | Patented | Aug. 10, 1971 |

[54] TEACHING DEVICE
7 Claims, 6 Drawing Figs.

[52] U.S. Cl. .................................................. 35/8 R,
    35/31 R, 35/62, 35/73
[51] Int. Cl. .................................................. G09b 3/00
[50] Field of Search .............................. 35/77, 62, 8
    R, 9 R, 9 A, 76, 5, 6, 31 A, 31 C, 35 D, 35 G

[56] References Cited
UNITED STATES PATENTS

| 183,157 | 10/1876 | Haggerty | 35/62 |
| 347,696 | 8/1886 | Du Shane | 35/62 |
| 2,643,467 | 6/1953 | Goodwin | 35/31 A |
| 3,346,968 | 10/1967 | Dellinger | 35/6 |

FOREIGN PATENTS

| 136,423 | 12/1919 | Great Britain | 35/77 |

Primary Examiner—Wm. H. Grieb
Attorney—John H. Widdowson

ABSTRACT: This invention is an apparatus to aid in the teaching of mathematics to children. It has a closed boxlike housing with a window to display the problems which are written on a sheet and attached to a roller mounted within the housing. The housing also has on its surface a member with a plurality of holes therein and pegs therefore and a member with a surface to receive indicia thereon for the student to formulate the problem's answer. The apparatus has a plurality of indicators to be operated by the student upon correctly answering each problem, and a senses-indicating system operable upon proper manipulation of the indicators.

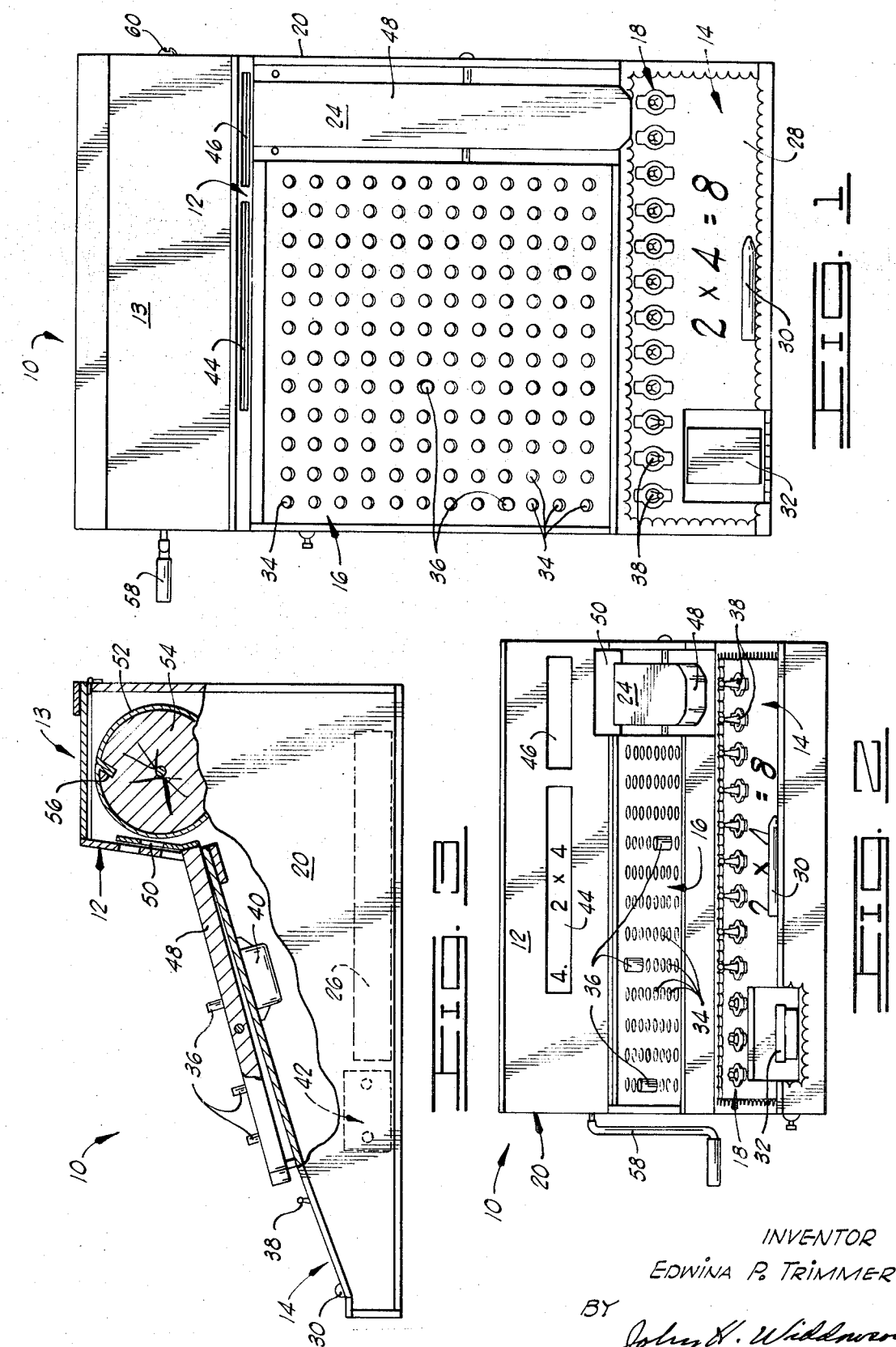

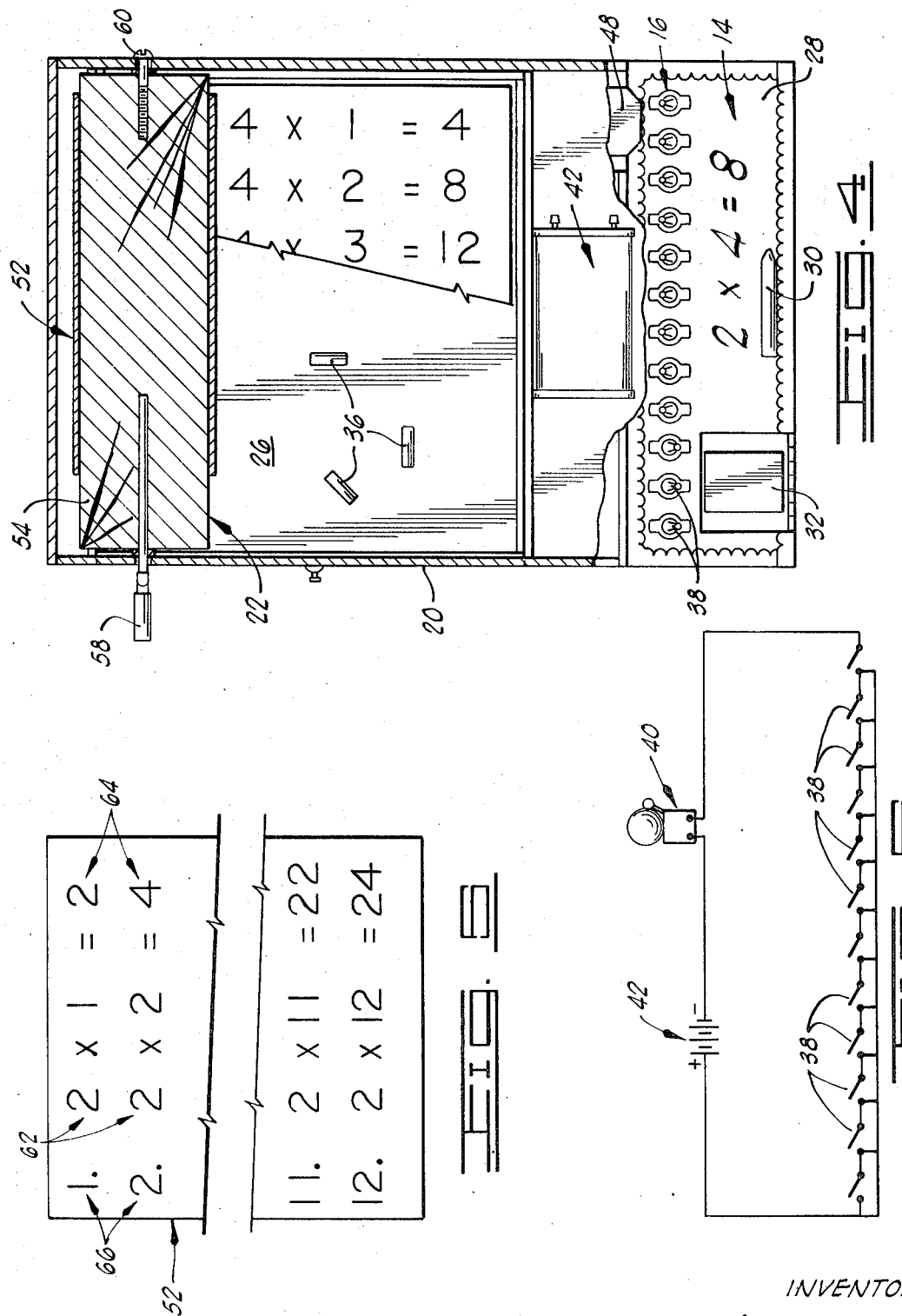

TEACHING DEVICE

Numerous devices are known in the prior art for the purpose of aiding in the teaching of mathematics to students. However, these prior art devices are generally of a complicated structural and mechanical nature and thus are difficult and expensive to build. Also, the prior art devices are not generally designed for easily changing of the type or particular group of mathematical problems presented the student. For instance, the complicated nature of the prior art device may prevent easy changing from multiplication-type problems to addition-type problems, if at all possible. In addition, the prior art devices generally require a detailed explanation for their intended operation and must be operated precisely to obtain correct answers. The general nature of the prior art devices can tend to fascinate the student by their operation to the extent that the student becomes involved in the device and loses the learning coordination of the material being presented.

In accordance with a preferred specific embodiment of this invention, an apparatus if provided that is simple to operate, easily adapts to different types of problems and can function if desired without an external electrical power source. The preferred apparatus of this invention is provided with a housing which contains a roller operable to retain the problem sheet member and rotate to display same through a window located on the front of the housing. The housing also preferably includes a drawer for storage of problem sheets and a bell or light with associated power source inside the apparatus, and on its outer surface it also includes a writing area, a pegboard or like member, and an answer-window-opening device.

In accordance with the preferred specific embodiment of the apparatus of this invention, its operation and use for aiding in the teaching of mathematics preferably to early elementary or mentally retarded children is excellent because it utilizes most of the student's learning senses. A series of mathematical problems are prepared on the problem sheet, placed on the roller and presented to the student one at a time by turning the roller and viewing them through the window. For a specific problem the student determines what he believes to be the correct answer by use of the pegboard and writing area. Then he operates the window-opening device and views the correct answer in the answer window. If the student's answer is correct, he then turns on a switch corresponding to the problem answered, then proceeds to the next problem by turning the roller until the next problem appears in the window. When the student has completed the series of problems and turns on the last switch the bell starts ringing or light comes on as the climax and serves as a reward. This use of the above-described apparatus combines the student' s visual and auditory senses with tactile and kinesthetic reinforcement to determine the correct answer to mathematical problems.

One object of this invention is to overcome the aforementioned disadvantages of the prior art devices.

Another object of this invention is to provide a teaching aid which brings into operation most of the student's senses and areas of learning such as auditory, visual, tactile, and kinesthetic, thus reinforcing the learning process.

A further object of this invention is to provide a teaching aid with alternative methods of determining the correct result of the question presented the student.

Still another object of this invention is to provide a teaching aid the operation of which is not dependent upon the particular type of problem presented to the student and to provide a device in which groups or sets of problems can be easily changed.

Another object of this invention is to provide a teaching aid which is easily constructed and economical to manufacture.

Various other objects, advantages and features of this invention will become apparent to those skilled in the art from the following discussion, taken in conjunction with the accompanying drawings, in which:

FIG. 1 is a top plan view of the apparatus of this invention shown with a mathematical multiplication problem thereon;

FIG. 2 is a front elevation of the apparatus of this invention shown with the mathematical multiplication problem thereon;

FIG. 3 is a side elevation of the apparatus of this invention with a portion removed for clarity;

FIG. 4 is a top plan view of the apparatus of this invention with portions removed for clarity;

FIG. 5 is a sectional plan view of a typical problem sheet for use with the invention; and FIG. 6 is a schematic diagram of the preferred electrical circuit of this invention.

The following is a discussion and description of a preferred specific embodiment of the teaching device of this invention, such being made with reference to the drawings whereupon the same reference numerals are used to indicate same or similar parts and/or structures. It is to be understood that such discussion and description is not to unduly limit the scope of the invention.

Referring to the drawings in detail and particularly to FIGS. 1 and 2, the apparatus of the teaching device of this invention, indicated generally at 10, has a mathematical problem shown in the window 12, a corresponding problem written on the writing area 14, having several pegs on the pegboard 16 and switches on the switch panel 18 placed in the on position.

The apparatus of this invention 10 includes a housing 20 which substantially encloses and generally mounts and supports the other components, a writing means 14 and switch panel 18, a pegboard 16, a roller 22, an answer-window-opening device 24 and a drawer 26.

The normally top frontal portion of the housing 20 includes the writing means 14 and switch panel 18, the pegboard 16 and window opener 24 and the window 12. The switch panel 18 and writing area 14 preferably extend substantially across the front of the apparatus 10, and are inclined slightly toward the rear and are slightly below the pegboard 16. The window opener 24, which is also inclined toward the rear, joins the nearly vertically disposed window 12 which extends substantially across the housing. The housing 20 joins the window 12 and forms an operable access door 13 to the roller 22 for reasons to be explained later. The writing area 14 shown as a chalk board 28 with chalk 30 and eraser 32 provides the student a means to scribe for himself the problem and solution. The pegboard 16 is a member with a uniformly spaced plurality of holes 34 therein adapted to receive pegs 36 which the student places there while making a visual and mechanical representation of the problem presented him. When the student is not using the pegs 36, they are preferably kept in the drawer 26 to prevent loss. The indicator panel 18 is preferably comprised of a plurality of switches 38 generally in a line across and above the writing means 14. The switches 38 are connected in series with each other, a bell 40 serves to stimulate the operator's senses and preferably a battery 42 serves as a source of electrical power. The window panel 12 joins the pegboard 16 and has two elongated rectangular windows, a problem window 44 and an answer window 46. The problem window 44 displays the problem presented to the student for solution, the answer window 46 displays the answer to the problem and is opened by depressing the lever 48 of the window-opening means 24, which raises the window cover 50 exposing the answer. The problem sheet 52 is held on the roller 54 of the roller 22 by being wrapped around the roller 54 and having its end portions positioned in a slot 56. The roller is rotated axially and supported by a crank 58 generally centrally attached to one of its ends, and it is supported by a screw 60 generally centrally attached the other end. The problem sheet 52 is preferably arranged with the problems 62 and answers 64 written in such a manner as to be easily visible through the windows 44 and 46 when the problem sheet 52 is placed on the roller 54, and additionally to have problem numbers 66 preceding the problems so the student can turn on the corresponding switch when the problem is correctly answered. The problems can be any form of mathematical expression, addition, subtraction, multiplication, division, abstract, symbolic or any type the student can solve by either of the two solution devices provided. Problem sheets are easily replaced by opening the access door 13 of the housing 20, rotating the roller 54 to a position of the slot 56 upward, and by finger pressure remove the problem sheet 52 from the slot 56; another problem sheet 52 can be easily inserted in the roller 54 by inserting one end into the slot 56, rotating one revolution and inserting the other end in the slot 56. The drawer 26 is positioned in the lower portion of the housing to open to one side. The drawer is preferably used for storage of the pegs 36 and additional problem sheets.

In manufacture of the apparatus 10 of this invention, it is obvious that all parts are preferably constructed of a material of sufficient strength to withstand use and abuse by elementary-aged children. Construction of the device would necessitate sufficient weight to prevent sliding while the student is writing, positioning the pegs or changing problems but not to the extent the device is not generally portable. Also, the construction has bee found to preferably include a nonremovable drawer 26 and sturdily attached access door 13 and window-opening lever 48.

In use and operation, it is seen the teaching device of this invention provides an apparatus and a method for aiding in the teaching of mathematics to preferably elementary or mentally retarded children, which is very flexible in the type of problems it can be used to present and coordinates their various learning senses. The apparatus, supra, is economical to manufacture, very simple to use by both teacher and student, attractive in appearance and is usable to aid teaching many types of mathematical problems.

While the invention has been described in conjunction with a preferred specific embodiment thereof, it will be understood that this description is intended to illustrate and not limit the scope of the invention, which is defined by the following claims.

I claim:

1. A mechanical apparatus to aid in the teaching of mathematics preferably to children, comprising:
    a. a substantially closed boxlike housing having a window means;
    b. means mounted within said housing adapted to receive and hold a sheet of paper or like material in position to view a problem on same through said window;
    c. a member attached to said housing having a plurality of uniformly positioned holes therein adapted to receive pegs and a number of pegs therefor;
    d. means having a surface attached to said housing and adapted to receive indicia;
    e. a senses indicating system attached to said housing, said system having a plurality of indicators and means to connect same to a source of power; and
    f. said housing having other window means to display answers on said sheet of paper or like material upon operation of a window-opening means normally covering same.

2. The mechanical apparatus as described in claim 1, wherein:
    a. said means to hold a sheet is a roller means rotatably mounted within said housing behind said first-named window means;
    b. said roller means has an attached crank member extending from said housing;
    c. said roller means has a slot therein to receive and hold said sheet of paper or like material substantially near its outer surface; and
    d. said roller means and said window means is positioned on the normally upper rearward portion of said housing having said window means facing forward.

3. The mechanical apparatus as described in claim 1, wherein:
    a. said member attached to said housing has a plurality of holes therein and is positioned on the normally upper surface of said housing in the central portion thereof, joins the lower portion of said first-named window means, and generally slants downward forwardly to join said means having a surface adapted to receive indicia;
    b. said window-opening means is positioned generally parallel to and alongside said member on the surface of said housing; and
    c. said means having a surface adapted to receive indicia extends substantially across said housing, and is inclined slightly to the normally operable rearward portion of said housing.

4. The mechanical apparatus as described in claim 1, wherein:
    a. said senses indicating system is operable to stimulate the sensory perception of a person operating said apparatus upon manipulating all of said plurality of indicators to a positive answer position; and
    b. said plurality of indicators is positioned generally in a line substantially across and on the upward end portion of said means having a surface adapted to receive indicia.

5. The mechanical apparatus as described in claim 2, wherein:
    a. said housing has on its normally upwardly disposed surface said member having a plurality of holes therein which joins said window means and said window-opening means and said means to receive indicia thereon.

6. The mechanical apparatus as described in claim 2, wherein:
    a. said housing contains said senses indicating system which is operable to perception by the senses of the operator of said apparatus upon proper manipulation of said plurality of indicators located on said housing.

7. The mechanical apparatus as described in claim 1, wherein:
    a. said housing has a roller means operable by a crank to hold and display said sheet of paper or like material at said window means positioned on the normally rearward portion of said housing and facing forward; and
    b. said housing has said member having a plurality of holes therein alongside said window-opening means and joining said window means and said means having a surface adapted to receive indicia; and
    c. said apparatus has said senses-indicating system with said plurality of indicators operable to the sensual perception of the operator of said apparatus upon their proper manipulation.